July 12, 1932.  W. D. LA MONT  1,866,893
STEAM GENERATION
Filed Jan. 23, 1926  10 Sheets-Sheet 1
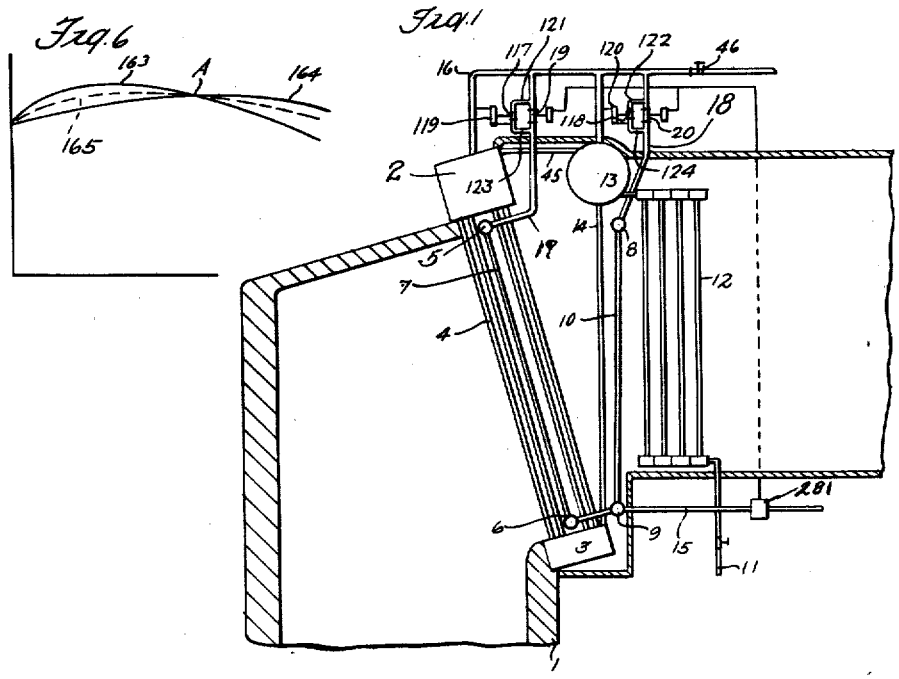
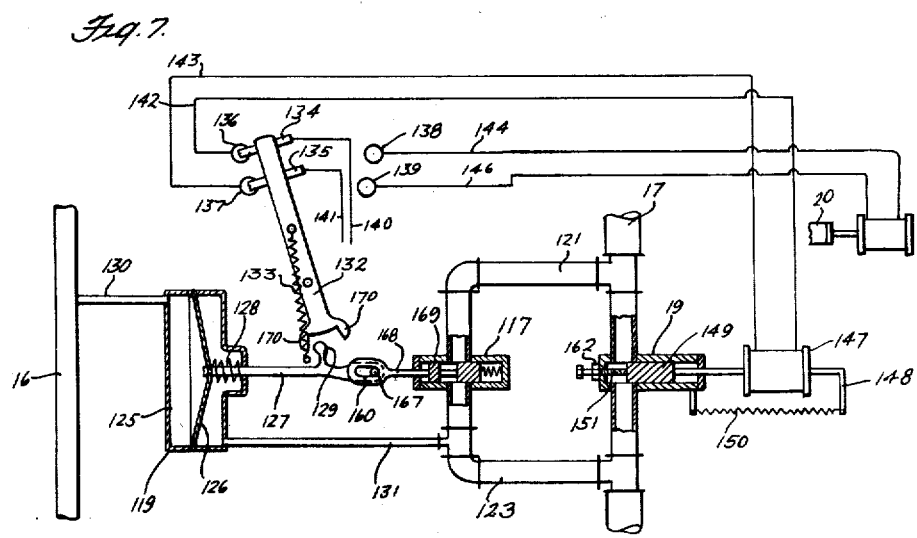
INVENTOR
WALTER DOUGLAS LAMONT.
BY
Newell & Spencer
ATTORNEYS

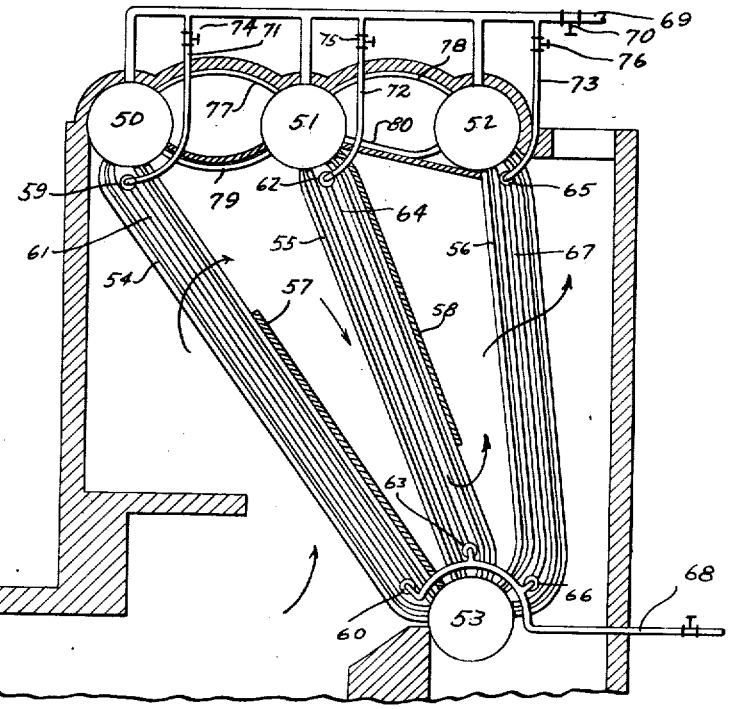
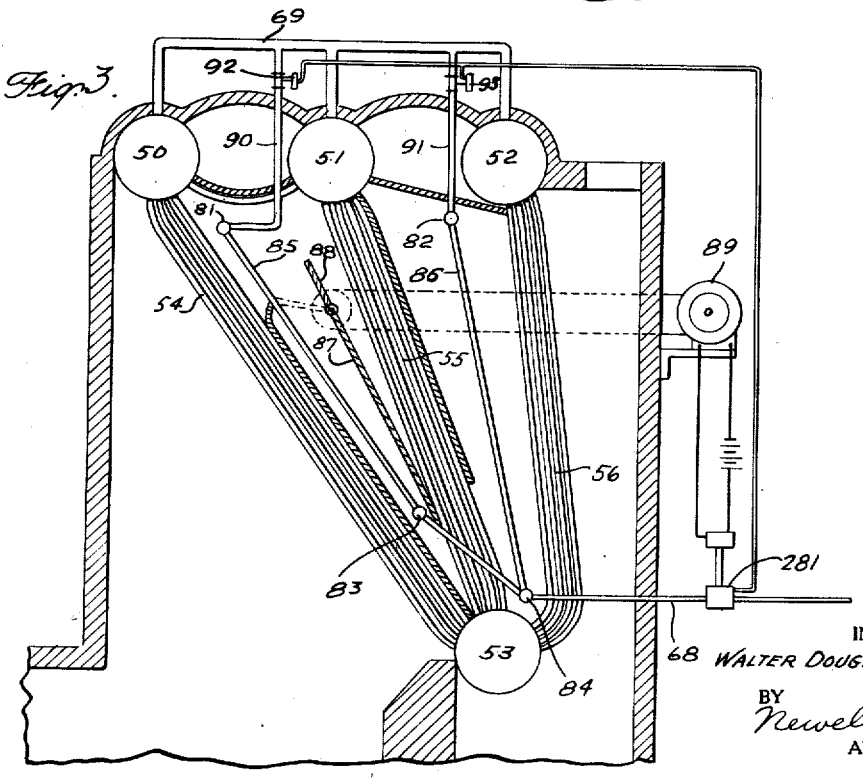

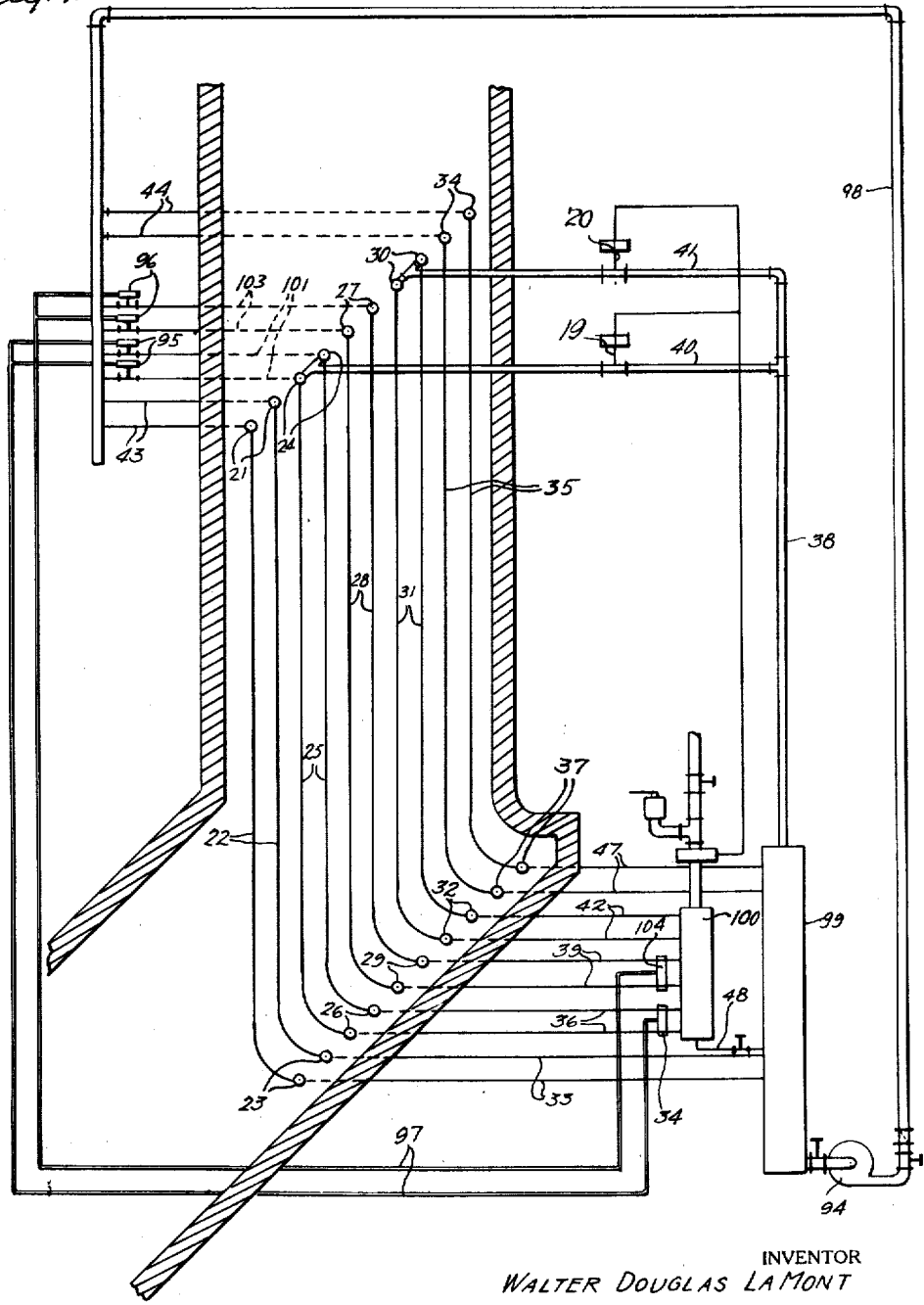

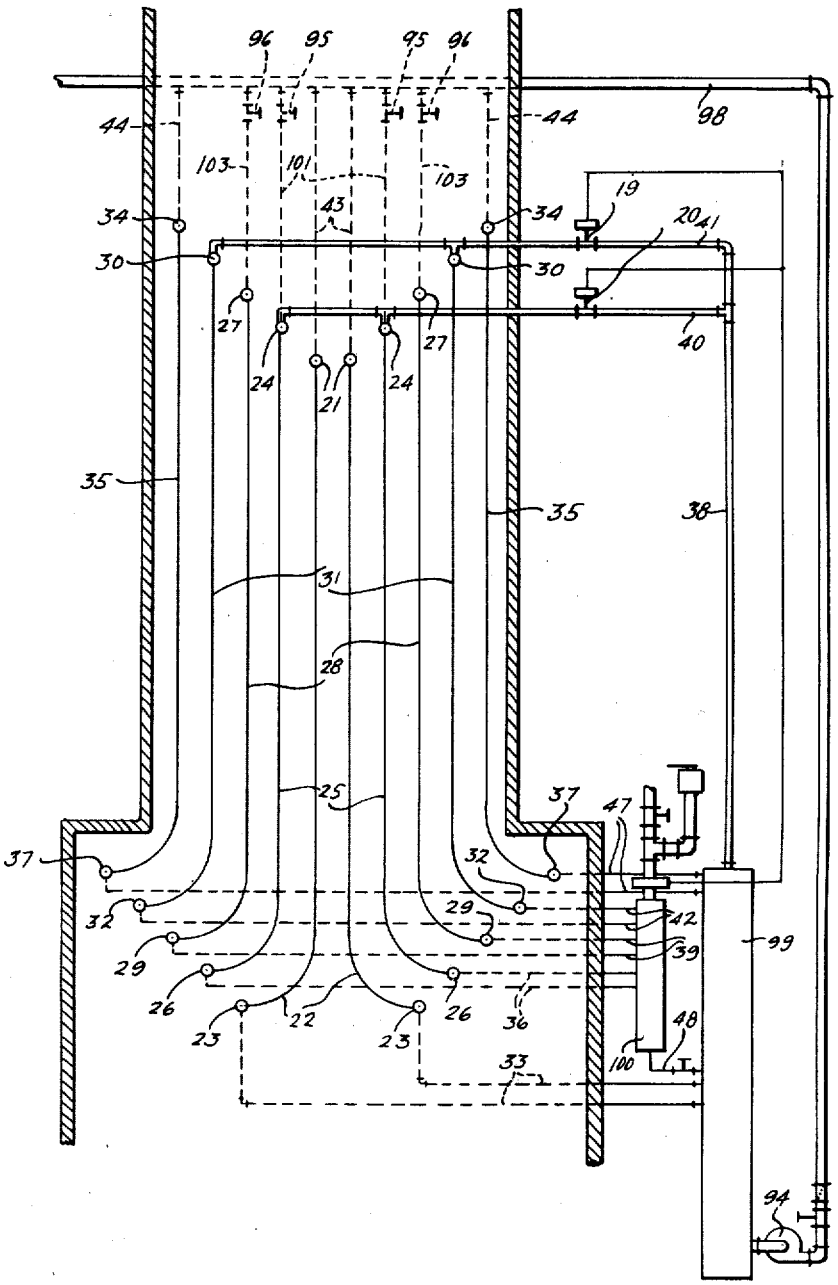

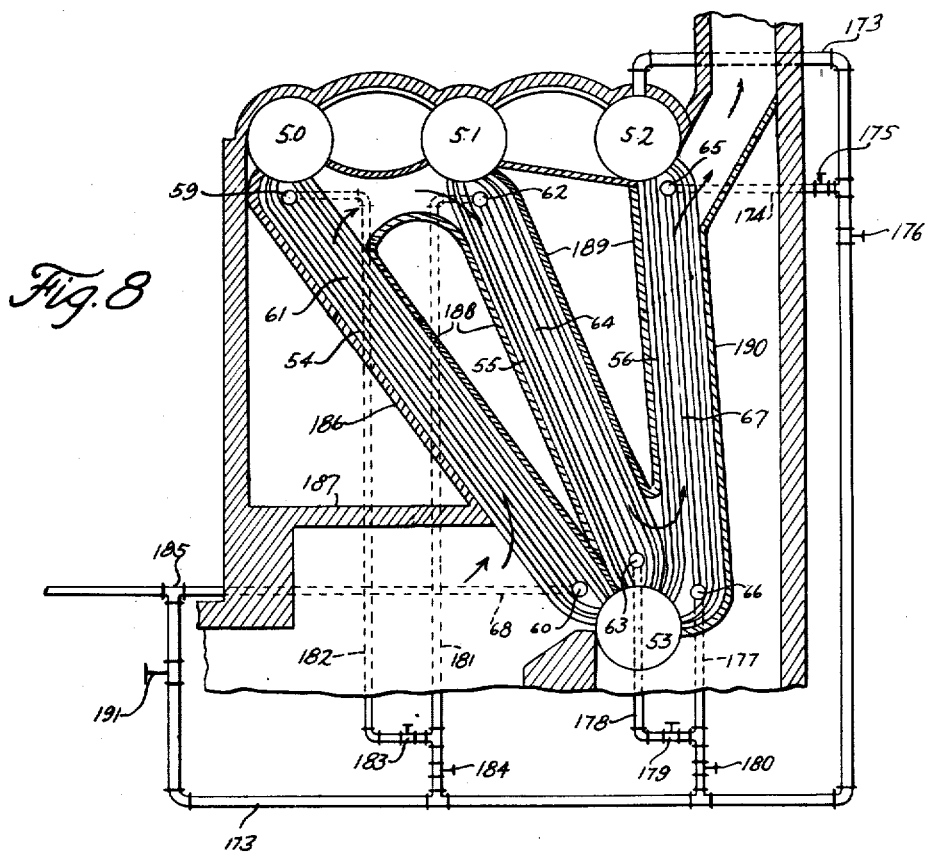

July 12, 1932. W. D. LA MONT 1,866,893
STEAM GENERATION
Filed Jan. 23, 1926 10 Sheets-Sheet 6

INVENTOR
WALTER DOUGLAS LAMONT
BY
Newell & Spencer
ATTORNEYS

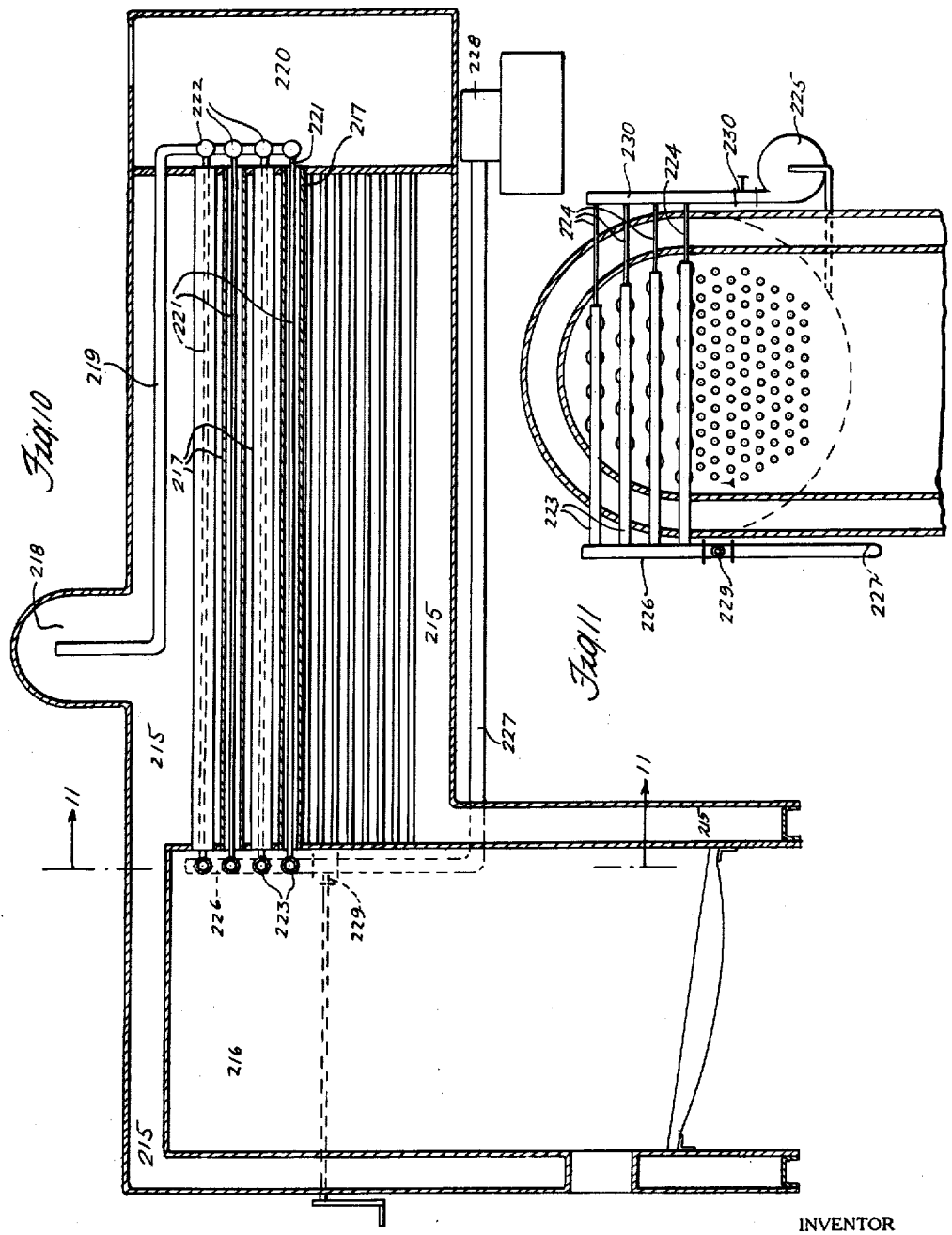

July 12, 1932. W. D. LA MONT 1,866,893
STEAM GENERATION
Filed Jan. 23, 1926 10 Sheets-Sheet 8

INVENTOR
WALTER DOUGLAS LAMONT
BY
Newell + Spencer
ATTORNEYS

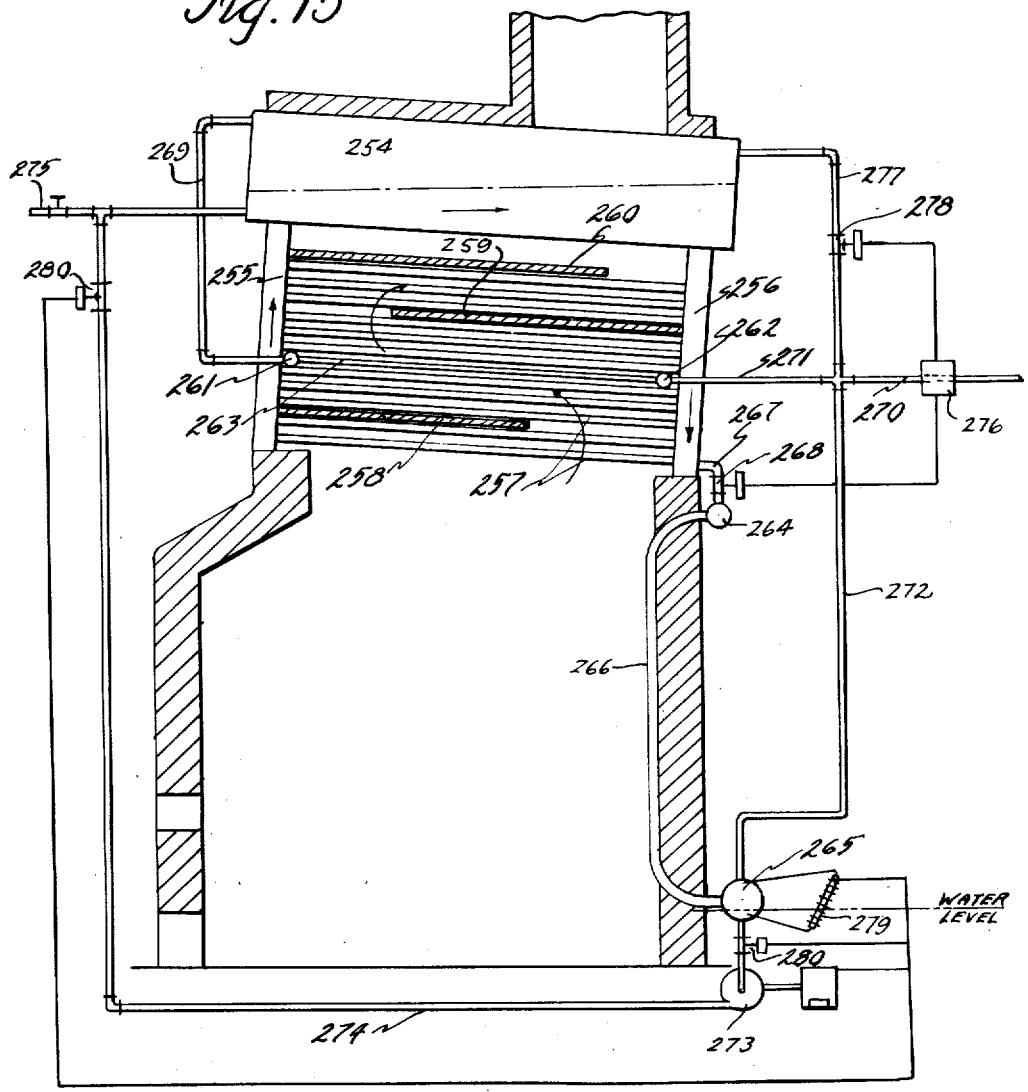

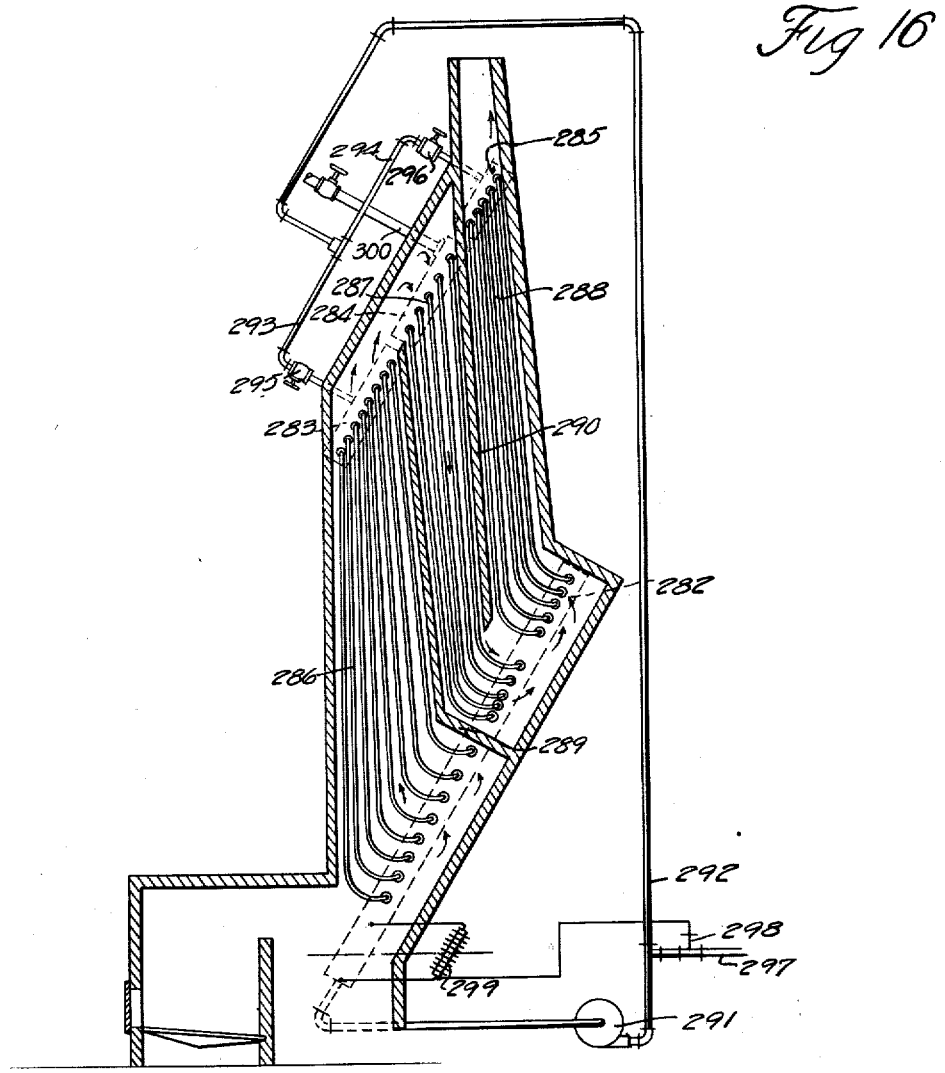

Patented July 12, 1932

1,866,893

UNITED STATES PATENT OFFICE

WALTER DOUGLAS LA MONT, OF NEW ROCHELLE, NEW YORK, ASSIGNOR TO LA MONT CORPORATION, OF NEW YORK, N. Y., A CORPORATION OF NEW YORK

STEAM GENERATION

Application filed January 23, 1926. Serial No. 83,235.

This invention relates to the generation of steam and more particularly to the control of superheating and to the construction and arrangement of superheaters.

Efficient superheating of steam which is essential in a large majority of installations for the production of power has hitherto been given relatively little attention. It has been the practice to place superheater tubes in any part of the boiler where there happened to be some free space without regard to the most efficient placing. Two main problems of superheating which have received but comparatively little attention in the past are solved by the present invention. The first problem is to maintain a substantially constant superheat with widely varying steam loads. The second problem is to protect superheater tubes from burning out when the amount of steam passing through them is temporarily reduced or when the heat increases too much.

Little or no attention has been paid to the first problem with the exception of a proposal which, so far as I know, has never been practically utilized in commercial work of regulating the amount of heating gases passing over superheater tubes by means of dampers. The second problem is dismissed in most ordinary boilers by placing the superheating tubes in such a position that even if they run empty they will not readily burn out. This crude method is very inefficient in many cases as with high superheats it is frequently desirable to subject the superheating tubes to relative high temperatures.

The present invention has for its object an accurate, simple and reliable control of the degree of superheat in steam boilers of various types while at the same time in its preferred embodiments protecting superheater tubes against accidental burning out.

The principles of the present invention are particularly applicable to film tube steam generators such as those described in my Patent No. 1,545,668, dated July 14, 1925, and when associated with steam generators of this type particularly effective results are produced. However, the invention in its broader aspects is in no sense limited to superheaters associated with steam generators of the film tube type and, on the contrary, many of its features may be applied with great advantage to various types of common boilers particularly of the water tube type.

According to the present invention superheat is controlled in three main ways. The superheater tubes may be arranged in such relation to the generator tubes that the proportion of the heat absorbed by the generator tubes and the superheater tubes under various conditions of load and rating, is the same. This method which is effected by arranging the superheater tubes or surface parallel or slightly inclined to and adjacent the generator tubes and the gas flow, is not sufficient under ordinary ratings to produce an accurately controlled superheat in the ordinary water tube boiler but when applied to a La Mont type of film tube generator with long generator and superheater tubes, this method is sufficient by itself in many cases to effect a substantially constant regulation of superheat under varying loads.

While in most ordinary water tube and fire tube boilers the heat absorption of the generating tubes and length of gas travel are not sufficient to efficiently regulate the temperature of superheater tubes arranged adjacent thereto, it is possible in the case of many types of water tube boilers and of some types of fire tube boilers to so rearrange the baffling as to confine the gases closely to the tubes and to produce a very long travel and high velocity. When in such installations superheater tubes are arranged substantially parallel and adjacent to the generating tubes and preferably so connected that the steam flow is counter to the gas flow throughout the whole of the superheater, effects very similar to those possible with a film tube boiler may be achieved and are included in the present invention. Not only does such redesigning or rebaffling of water tube boilers make it possible to control and stabilize the superheat but by producing long gas travel along the generating tubes the efficiency of the boiler as a steam generator is very greatly enhanced. When, in addition, superheater tubes are placed adjacent to the generator tubes and thus more completely fill in the gas passage, other advantageous results follow. In the first place, the closer arrangement of tubes which is brought about by the addition of the superheater tubes decreases the hydraulic mean depth of the heat transfer surface and correspondingly its heat transfer efficiency. The reduction in gas space also has the important result that the gas velocity over the tubes is very greatly increased and I have found that such an increased gas velocity in a water tube or fire tube boiler greatly improves the efficiency of the boiler and particularly its heat transfer capacity.

Superheater tubes arranged inside of fire tubes in fire tube boilers having long tubes have an effect similar to that which is achieved with rebaffled water tube boilers as described above. This effect, of course, is only realized in full when the superheater tubes extend throughout substantially the whole length of the fire tubes and the steam in these tubes flows counter to the gas flow. It has been proposed to insert small hairpin-shaped superheater tubes in a short portion of the fire tubes of a fire tube boiler but such an arrangement has but little value in increasing the efficiency of the boiler and is not effective in producing an even superheat because the steam flows first in one direction and then in the opposite direction and the gas travel over the superheater tubes is relatively short. The hydraulic mean depth is decreased and the velocity of gas passage through the fire tubes containing the superheater tubes is increased and the boiler as a whole becomes more efficient in addition to the desired effect in the control of superheat. As used in the present specification the expression "hydraulic mean depth" is defined as the quotient of the area of the cross-section of the gas stream divided by the perimeter formed by the heating surface of the boiler and touched by the gases.

In using the word "parallel" in describing superheater placement it should be understood that what is really important is that the steam flow as a whole is parallel to the gas flow and in the preferred embodiment is counter to the gas flow. In most modifications embodying this feature of the invention the superheater tubes are themselves parallel but it is, of course, possible to arrange superheaters with winding tubes so that while the tube itself is not parallel to the gas flow in all positions the superheater, as a whole, possesses a steam flow which runs in a plane parallel to the gas flow.

A second method which is applicable equally to generators of the ordinary water tube and to generators of the film tube type consists in providing a plurality of superheaters or sets of superheater tubes arranged in zones of different heat in the furnace or gas passage and means for varying the relative steam flow through these different superheaters which discharge into a common superheated steam main. By varying the relative flow through the different superheaters of different heat transfer capacities the final superheat of the steam after mixing the products from the various superheaters can be held constant under varying conditions of load and fire. The regulation may be manual or automatic or may be partly manual and partly automatic. This method of superheat control particularly when applied to La Mont steam generators, is preferably associated with superheaters running parallel to the generator tubes and to the gas flow in order to take advantage of the effects of parallel placing. It should be understood however, that the second method is not dependent on parallel placing alone and may be used with superheaters placed in any desired relation where a non-parallel placement is desirable for structural or other reasons.

The control of superheat by the second method outlined above may be supplemented by control of the amount of heating gases permitted to pass over the heating surfaces of the various superheaters. This method is less desirable and is not as suitable as the control by variation of steam for use as the sole superheat control. In some instances, however, it may very advantageously be combined with the other methods of superheat control described in the present invention and in such combination forms a part of the present invention.

The third method of controlling superheat consists in injecting water into the superheated steam in varying amounts to control the amount of superheat. The water may be injected after the steam has left the superheaters but is preferably injected into the steam before it enters the superheaters. This latter method presents the great added advantage that the injected water prevents burning out of the superheater tubes when the steam flow is markedly reduced and is of particular advantage in installations where it is desired to produce high superheats and consequently where it is desirable to place the superheater tubes in a relatively hot zone of the furnace in order to efficiently produce relatively high steam temperatures. In such locations, of course, the superheater tubes are especially exposed to the dangers of burning out and water injection is of great advantage in protecting the tubes as well as controlling the superheat. The water injection may be in the form of a spray or in the form of a film on the inside of the superheater tubes or the superheated steam pipe or may be injected or introduced in other suitable ways. Injection of the water in the form of a film as described in connection with the generation of steam in my prior patent is particularly effective and constitutes one of the preferred features of the present invention which, however, is not limited to film formation in its broader aspects. Obviously, of course, water injection may be combined with the other methods of superheat control referred to above and various combinations of two of the methods outlined or of all three are included in the present invention.

The invention will be described in greater detail in connection with the drawings which illustrate a few typical installations embodying the principles of the present invention. It should be clearly understood of course, that the invention is in no sense limited to the types of boilers or methods of installation illustrated in the drawings but is of general application, the drawings merely being typical illustrations of the application of the invention and do not constitute limitations thereof. Certain of the specific preferred constructions of the present invention are illustrated in the drawings and these features, while not limiting the invention in its broader aspects, are included as novel elements thereof apart from the general principles of the invention in its broader application. The drawings are for the most part diagrammatic, as the principles of the invention do not depend for their utility on specific detailed structural features of particular boilers and, on the contrary, the various structural features of different types of boilers which may be desirable in particular installations may be utilized in connection with the features of the present invention, as will appear clearly to those skilled in the art in any particular installation. In particular, the drawings show the film tube steam generators of the La Mont type in a diagrammatic form and it is to be understood that the various structural details, such as tube and orifice construction, which have been described in my prior patent and in my prior co-pending application, Serial No. 32,064, may be used.

In the drawings—

Figure 1 is a section through a single pass water tube boiler showing automatic superheat control;

Figure 2 is a section through a cross drum bent tube water tube boiler and superheater showing manual control;

Figure 3 is a section through a similar type of boiler showing automatic superheat control by combined steam and gas regulation;

Figure 4 shows a diagrammatic vertical cross-section through a film tube steam generator and superheater; and Figure 5 shows a similar section through a film tube steam generator and superheater with manual superheat control.

Figure 6 shows a diagram of the superheat in a system using two separate superheaters at different zones with a fixed setting of the valves;

Figure 7 is a detail view of a modified pressure valve mechanism similar to the one shown in Figure 1;

Figure 8 is a bent tube cross drum boiler rebaffled to produce parallel gas flow;

Figure 10 is a vertical section through a locomotive boiler and superheater; and Figure 11 is a cross-section at right angles to Figure 10 along the time 11—11;

Figure 15 is a section through a horizontal tube boiler combined with two superheaters, one of which is provided with water injection; and Figure 16 is a section through a film tube generator showing an integral superheater structure.

Figure 9:
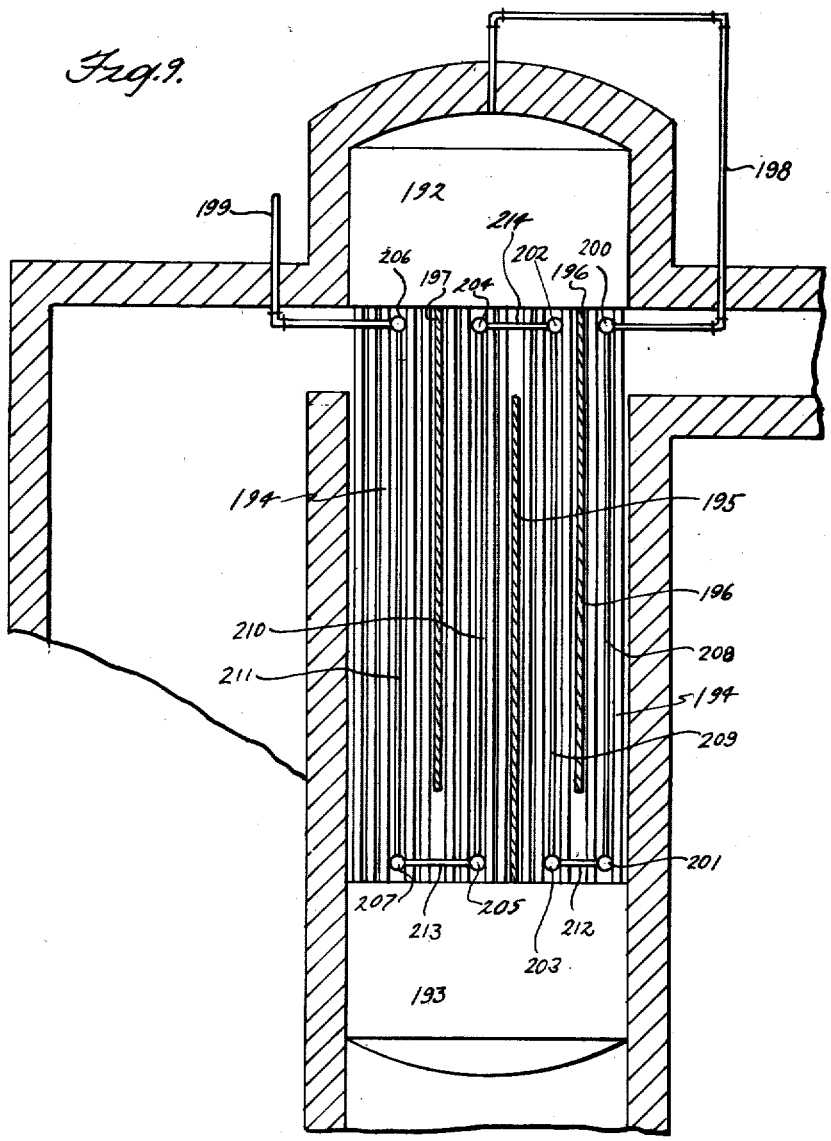
Figure 9 is a section through a Wickes boiler re-baffled according to the present invention.

The drawings are diagrammatic in character and the invention is not limited to any details of construction and on the contrary is applicable to any type of film tube generator described in my prior Patent No. 1,545,668, and application Serial No. 32,064, filed May 22, 1925. In a similar manner, the invention is applicable to any of the ordinary types of water and fire tube boilers and accordingly the figures which show water tube boilers show these in schematic form and are not intended to be limited to any particular structural features apart from the superheater placement.

In the drawings shown in Figure 1, the combustion chamber walls are indicated at 1. The single pass water tube boiler consists of upper drum 2 and lower drum 3 connected by water tubes 4. One superheater having headers 5 and 6 and tubes 7 is placed adjacent to and parallel with the water tubes. A second superheater with headers 8 and 9 and tubes 10 is placed in a colder zone. The feed water for the boiler passes through pipe 11 and feed water preheater 12 into drum 13 and thence through tubes 14 into the lower drum 3.

The lower headers of the superheaters are connected to the superheated steam main 15, while the upper headers of the superheaters are connected to the saturated steam main 16 through the pipes 17 and 18 provided with valves 19 and 20. These valves are controlled by a thermostat 281 located in the superheated steam main. Drums 2 and 13 are connected by a steam pipe 45 and the saturated steam main 16 is also provided with a valve 46.

The operation of the boiler is as follows: Saturated steam is generated in the tubes 4 and passes through both of the superheaters, the relative proportions being determined by the valves 19 and 20. The superheater tubes 7 being in a much hotter zone than the superheater tubes 10, have a much higher heat transfer capacity and for highest superheat, a relatively large proportion of the saturated steam should pass through the tubes 7.

The valves 19 and 20 and thermostat 281 may be set so that at low load the desired amount of superheat is produced. When the load on the boiler is increased and correspondingly the fire is also increased a larger amount of saturated steam is passed through the superheaters which are, however, also subjected to a considerably higher heat. The heat absorption capacity of the generator tubes is very much higher than that of the superheater tubes owing to the large latent heat of water. As a result an increase in load tends to increase the superheat, as the larger heat head on the superheater tubes transfers sufficient heat that more than compensates for the increased steam flow. The superheat temperature rises as shown in Figure 6, in each of the superheaters until a certain load is exceeded at which point the speed with which the steam passes through the superheater becomes so high that the steam, even with the higher heat head, does not have sufficient time to absorb enough heat to maintain the superheat constant. As shown in Figure 6 which is taken from a boiler of the type shown in Figure 1, the superheater in the hottest zone reaches its peak before the superheater in the lower heat zone and consequently before the total superheat of the steam from both of the superheaters. This is due to the fact that at the settings for maximum superheat efficiency a very much larger proportion of the steam passes through the superheater in the hottest zone and accordingly this superheater reaches the point beyond which the steam flow is too rapid to effectively absorb heat long before the superheater in the colder zone which carries a much smaller percentage of the total steam. The curve in Figure 6, in which the solid curve 163 corresponds to the superheat temperature in the superheater tubes 7 and curve 164 to that in the superheater tubes 10, while curve 165 shows the heat of the steam from both superheaters after mixing, is to be taken only as an example and of course the curves for different installations will vary with the proportions of superheating surface in different heat zones and with other operating conditions of the particular installation.

As the load on the boiler increases, if no change were made in the setting of valves 19 and 20, the superheat temperature would increase but by setting the thermostat 281 to vary the proportion of steam flowing through the different superheaters with changing superheat temperature an accurate control may be had. The throttling action of the control valves 19 and 20 builds up a slight excess pressure in the saturated steam drum and its pipe 16. When this pressure exceeds a predetermined maximum it actuates the pressure valve 119 which opens a by-pass 117 around the valve 19 and discharges a larger amount of steam through the superheater tubes 7. At a higher pressure differential the valve 120 operates to open a by-pass valve 118 around the valve 20, the steam flowing through the by-pass tubes 121, 122, 123 and 124. Thus too high pressures are avoided and the superheaters are protected from excess temperatures. This operation in the installation shown in Figure 1 is in the nature of an emergency operation and of course causes the superheat to drop very markedly.

The valves 19 and 20 may be operated in various ways to control the superheat and the invention is not limited to any particular method. I have found that a very satisfactory method consists in setting the valve 19 as shown in Figure 7, so that it is about three-quarters open, the precise degree of opening depending on the particular installation. The valve piston 149 is prevented from closing more than one-quarter by the adjustable stop 151 which is held in position by the lock nut 162. The valve 20 at low load is practically closed and is electrically connected to the thermostat 281 through the wires 140, 141, arm contacts 134 and 135, contacts 138 and 139 and wires 144 and 146. As the load increases and the superheat correspondingly rises the thermostat gradually opens the valve 20 permitting a larger proportion of the steam to pass through the colder superheater tubes 10. When the valve 20 is fully opened at which point a larger proportion of steam than normal is passing through the tubes 10 owing to the partial closure of the valve 19, the superheat conditions are somewhat different from that shown in Figure 6. Owing to the restricted gas flow the superheater tubes 7 are operating on a portion of the curve 163 to the left of the point A whereas the tubes 10, owing to the relatively larger amount of steam flowing through them, are operating on a portion of the curve 164 to the right of A. In the meantime, owing to the throttling effect of the two valves 19 and 20, the pressure differential between the pipe 16 and the superheater tubes 7 steadily rises. This gradually actuates the valve 119 as shown in Figure 7. This valve consists of a casing 125, a diaphragm 126 to which is attached a rod 127, a valve spring 128 and pipes 130 and 131 connecting the casing on different sides of the diaphragm to the pipe 16 and 123 respectively. The increase in differential pressure between the pipe 16 and the pipe 123, which is in direct connection with the superheater tubes 7, causes the diaphragm to move and this, in turn, moves the rod until the projection 129 strikes one of the projections 170 on the rod or arm 132. The arm is moved and snapped over by means of the spring 133 so that the contacts 134 and 135 on the arm are disconnected from the contacts 138 and 139 and connected to the contacts 136 and 137. These contacts carry the current from the wires 141 and 140 leading from the thermostat, through the wires 142 and 143 to the solenoid 147 which actuates the rod 148 connected to the piston 149 of the valve 19. As the wires are reversed the operation of the solenoid is the opposite of valve 20 which is of similar design. In other words, as the temperature of superheat decreases with increasing load, owing to the fact that the load has brought the boiler past the peak of superheat shown in the curves in Figure 6, the thermostat, instead of causing valve 19 to close causes it to open further letting a larger proportion of the steam flow through the superheater tubes 7 and accordingly increasing the superheat or, in other words, keeping the total superheat relatively constant. At the same time, the opening of valve 19 permits a larger and freer flow of steam and counteracts the tendency for a pressure differential to build up between the pipe 16 and superheater 7. This pressure, however, slowly increases with increased load and finally moves the valve 119 to a point where the pin 167 encounters the end of a slot in a sleeve 160, surrounding the end of the rod 127 and causes this sleeve with its connected rod 168 and valve piston 169 to move, thus opening the by-pass around valve 19 and tending to still further increase the proportionate flow of steam through the superheater tubes 7. In Figure 7 the valve is shown at the point where it begins to open the by-pass valve 117. The pressure valve 120 which controls the by-pass valve 118 is set so that it will not open this by-pass valve until the pressure differential between the pipe 16 and the superheater tubes 10 reaches a figure higher than that necessary to open the valve 117. The valve 120 is thus an emergency valve which prevents the building up of too high pressure in the steam spaces of the generator.

When the load decreases the reverse operation takes place, the valve 19 being slowly closed by the spring 150 and at the proper time the valve 119 trips the arm 132 connecting the thermostat to the valve 20 and as the superheat temperature begins to fall with decreasing load the thermostat closes the valve 20.

Instead of opening one of the valves 19 and 20 at a time to effect control of superheat one valve may be opened and the other closed to bring about a variation in the relative flow of steam through the two superheaters. It is also not necessary in all cases to reduce superheat by passing more steam through the colder superheaters. In certain arrangements this effect may be produced by increasing the flow through the hot superheater. This effect is noticeable mainly where the surface of the hot superheater and the velocity of steam through it are in such a relation that the superheater delivers maximum superheat at a comparatively very small steam flow.

It is possible by running the steam generator on one or the other side of the point A in Figure 6 to use a simpler valve action and in practice this may be very desirable in order to avoid the extra complication of the valve action shown in Figure 7. It should also be understood, of course, that the thermostat may actuate the controlling valves through means which are not electrical and the invention is not to be considered in any sense limited to the precise mechanical details shown in Figure 7 which is intended merely as an illustration of one type of operative valve drive and any other type which will perform the same function may be substituted. The valve arrangement shown in Figures 1 and 7 is in no sense limited in its utility to the particular type of single pass boilers shown in Figure 1 and on the contrary, this type of valve actuation may be applied to any of the other types of boilers illustrated in the drawings or to which the principles of the present invention are to be applied. In the figures to follow the actuation thermostatically of superheater control valves will not be shown in structural detail and any system such as one similar to that shown in Figures 1 and 7 may be used. The invention is in no sense limited to a particular design of valve drive or control system and any suitable system or combination of systems which may be desirable in any particular installation can be used and are included within the scope of the present invention. Steam generator installations vary so greatly in type, in operating conditions and in structural space available, that it is impossible to illustrate all types of installations and it should be clearly understood that the particular structural details which may be necessary in order to include the principles of the present invention in particular generator installations will be clear to the skilled steam engineer.

Instead of using a thermostat 281 in the superheated steam main at a point beyond the junction of the pipes from the separate superheaters it is, of course, possible to use two thermostats in the pipes connecting the individual superheaters to the superheated steam main. In some simple cases where the boiler is operated throughout a portion of the superheat curve only it may be possible to provide satisfactory regulation by placing a single thermostat in the pipe leading from the cooler superheater to the superheated steam main. It is also possible to use thermostats in the separate superheater main as shown in Figure 1. This arrangement may be desirable where a very close control of superheat is desired. Other combinations of thermostat locations may also be used and are included in the invention.

Instead of using thermostats to effect automatic control by variation of the property to be controlled, namely, the superheated steam temperature, other instruments may be used which measure properties or characteristics whose variation is a function of the superheat. Such properties may be steam velocity in certain cases or pressure drop in one or more of the superheaters or in any portion of the superheated steam flow or any other suitable varying properties may be utilized to effect automatic superheat control.

In Figure 2, a different type of water tube boiler is shown consisting in upper cross drums 50, 51 and 52 and lower cross drum 53 connected by three sets of water tubes 54, 55 and 56. Baffles 57 and 58 force the gases to pass through the boiler in the direction indicated by the arrows.

Three sets of superheater tubes are provided closely adjacent to the three sets of water tubes. These superheaters consist of headers 59 and 60 connected by tubes 61 placed among the first set of water tubes, headers 62, 63 and tubes 64 placed in the second set of water tubes, and headers 65 and 66 connected by tubes 67 placed in the third set of water tubes. The three lower superheater headers 60, 63 and 66 are connected to the superheated steam main 68 and the cross drums 50, 51 and 52 are connected with the saturated steam main 69 controlled by the valve 70. The upper superheater headers 59, 62 and 65 are connected to the saturated steam main through the pipes 71, 72 and 73 provided with the valves 74, 75 and 76. The drums 50, 51 and 52 are also connected by steam tubes 77 and 78 and by water tubes 79 and 80.

The operation of the boiler is similar to that shown in Figure 1, except that the temperature of the superheated steam is controlled by manually operating the valves 74, 75 and 76.

Figure 3 shows a boiler of similar design to that in Figure 2, but provided with two superheaters instead of three and arranged for automatic control of the steam and of the gases. The two superheaters are shown with upper headers 81 and 82 and lower headers 83 and 84, and superheater tubes 85 and 86. A baffle 87 is introduced to deflect some of the gases in normal operation along the superheater tubes 85. The upper end 88 of the baffle 87 has a hinged portion which can be actuated by the motor 89 to vary the amount of gases which are permitted to pass over the lower reaches of the superheater tubes 85.

The superheated steam main is provided with a thermostat 281 and the superheater headers are connected to the saturated steam main 69 by the pipes 90 and 91 provided with the valves 92 and 93 which are actuated by the thermostat 281. During the operation of the boiler, when the temperature in the superheated steam main rises, the thermostat 281 opens the valve 93, while partially closing the valve 92 and actuates the step by step motor 89 which in turn rotates the movable baffle 88. As a result, a smaller amount of steam passes through the high temperature superheater tubes 85 and at the same time the flow of gases over these tubes is also decreased by operation of the baffle 88. The result is to lower the temperature of the superheated steam to a predetermined value and to maintain the superheat constant with varying loads.

Figures 4 and 5 illustrate LaMont film tube generators and superheaters in which both saturated and superheated steam is generated, the saturated steam being generated in some of the tubes and superheated in others. For this purpose, two lower separators or pots 99 and 100 are provided, the pot 99 being for the separation of water and saturated steam, and the pot 100 being a superheated steam collector. Water from the pot 99 is circulated, by means of the pump 94, through the pipe 98 and passes through the pipes 43 and 44, into the upper headers 21 and 34 respectively, and thence through the tubes 22 and 35 to the lower headers 23 and 37, and thence through the pipes 33 and 47 to the pot 99. The amount of water injected in the tubes is greater than that which can be evaporated by passing therethrough, and accordingly saturated steam is produced at all times, the tubes 22 therefore acting as a screen to cool down the hottest gases which, for example, may be at 3000° F. The tubes 35 in the coolest zone, which may, for example, have a gas temperature of about 800° F., are also used for the generation of saturated steam as the temperature of the saturated steam is sufficiently low so that heat can be abstracted economically from the coolest gases.

Steam from the pot 99 passes through the pipe 38 and pipes 40 and 41 to the headers 24 and 30. In the headers 24 a certain amount of water is injected through the pipes 101 controlled by the valves 95, the amount of water being insufficient to produce saturated steam, but being sufficient to protect the tubes 25 against burning out in the heat zone in which they are situated, which may, for example, possess a gas temperature of about 2000° F. The water and saturated steam pass from the headers 24 into the tubes 25 to the lower headers 26, and thence the superheated steam produced in the passage passes through the pipes 36 to the superheated steam collector 100. The saturated steam from the headers 30 passes through the tubes 31, in a zone which may, for example, have a temperature of about 900 to 1000°, where it is superheated and is collected in the lower headers 32 passing through the pipes 42 into the superheated steam collector 100. Water from the pipe 98 is also injected through the pipes 103 controlled by valves 96 into the headers 27 in amount less than that which can be evaporated in passing through the tubes 28, which are situated in an intermediate heat zone which may have a temperature of about 1500°. The superheated steam produced in the tubes 28 is collected by the headers 29 and passes through the pipes 39 into the superheater steam collector 100. A valved drain pipe 48 connects the collector 100 with the pot 99 so that when the boiler is first started, if saturated steam is produced in the collector 100 for a short time, any water condensing can be caused to flow into the pot 99 and thus into the circulating system, any accumulation of water during operation of the generator may be similarly drained off.

The La Mont generating tubes 22 and 28 have such a large heat absorption capacity that the temperature gradient along the superheater tubes adjacent to the generating tubes is kept in substantially the same proportion despite varying loads on the generator. This in itself effects an important control and stabilization of the superheat, but in order to render the control still more even, thermostats 34 and 104 are placed in the pipes 36 and 39 and actuate through connection 97 the valves 95 and 96 which control the amount of water introduced into the superheater tubes 25 and the superheated steam generating tubes 28.

Figure 5 illustrates a very similar design of film tube generator and superheater in which the gases pass directly up and around the tubes and the hot zones run from the center of the generator to the sides. Similar parts bear the same reference characters as in Figure 4. The operation is very similar to that in Figure 4 except that the valves 95 and 96 are actuated manually instead of automatically.

The same arrangement for automatically controlling the amount of steam passing through the super-heaters according to the temperature of the super-heated steam, as described in connection with Figure 1, may also be employed in the constructions illustrated in Figures 4 and 5 and for this purpose valves 19 and 20 are provided in the pipes 40 and 41 respectively, which valves are connected to a thermostat 281 situated in the connection leading from the super-heater collector 100. The operation of these valves and their control is exactly the same as described in connection with Figures 1 and 7.

In Fig. 8, a cross drum bent tube boiler of the same general design as that shown in Fig. 2 is illustrated. The generator is rebaffled in order to keep the heating gases closely confined around the generating and superheating tubes. The figure also illustrates a series connection of superheaters. Similar parts will bear the same reference characters as in Fig. 2. Instead of connecting the upper superheater headers 59, 62 and 65 by means of separate pipes to the saturated steam collector 69, steam is taken from the steam space of drum 52 through the pipe 173. This pipe is connected through the pipe 174 and valve 175 to the superheater header 65. The remainder of pipe 173 can be cut off by closing valve 176. The lower header 66 of the rear superheater is connected through pipes 177, 178 and valve 179 to the lower header 63 of the intermediate superheater. A by-pass connection to pipe 173 is provided through valve 180. The upper header 62 of the intermediate superheater is connected to the upper header 59 of the superheater in the first pass through the pipes 181 and 182 and the valve 183, a by-pass to the pipe 173 being provided through the valve 184. The superheater steam main 68, which extends from the lower header 60 of the superheater in the first pass, is also connected at the T 185 with the extension of the pipe 173.

The gas flow through the steam generating tubes is shown by the arrows and is confined by the baffle 186 extending from the extension 187 of the wall to the drum 50 and by the double or hollow baffles 188 and 189 and the rear baffle 190. The gas flow is upward in the first pass, downward in the second pass, and upward in the third pass. As will be seen, the baffles confine the gas very closely to the generating tubes and superheater tubes. Owing to the close position of these tubes, the heat of the gases is very efficiently utilized and the close adjacent placement and parallel placement of the superheater tubes and generating tubes brings about a very even gradient on the superheater tubes which is very similar to that which can be produced in a film tube generator of suitable design as has been described in connection with Figs. 4 and 5.

In operation, valves 176, 180 and 184 are closed and valves 175, 179 and 183 are opened. The steam thus flows through pipe 173, valve 175 and pipe 174 into the upper header 65 of the rear superheater. Thence, it flows down through the superheater tubes 67 and lower headers 66 through the pipes 177, valve 179 and pipe 178 to the bottom header 63 of the intermediate superheater. Thence, the steam flow is upward through the superheater tubes 64 to the upper header 62 down through pipe 181 and thence through valve 183 and pipe 182 to the upper header 59 of the superheater in the first pass where the steam flows downwardly through the tubes 61 to the bottom header 60 and out through the superheated steam main 68. It will be apparent that the steam passes in series through all the superheaters and in each superheater the steam flow is counter to the gas flow. I have found that such an arrangement effects a very desirable even control of superheat without automatic or manual adjustment of valves. Where, however, it is desired to by-pass part or all of the steam around any one superheater, this can be effected by suitable adjustment of the valves. Thus, for example, if valves 175, 191 and 184 are closed and valves 176, 179, 180 and 183 are open, the steam will be by-passed around the rear superheater. If, on the other hand, valve 180 is closed and 184 is opened, steam will be by-passed around both the middle and rear superheater and will pass only through the superheater in the first pass. Obviously, the second superheater will be by-passed by closing the valve 179, opening the valves 180 and 184, the valves 191 and 176 remaining closed. Varying proportions of the steam can be by-passed by a suitable opening or closing of the valves described above or a certain amount of saturated steam may be by-passed around all three of the superheaters by closing valves 175, 180 and 184 and by opening valves 191 and 176 to the desired extent. In practical operation, where it is desired to reduce the superheat due to forcing of the boiler, a simple and effective means consists in introducing a small amount of saturated steam directly into the superheated steam main 68. In this arrangement, therefore, the main portion of the steam passes in series through all three superheaters as has been described above. A definite controllable portion of saturated steam is by-passed by means of valves 176 and 191 and serves to keep the superheat down to the desired point.

Where it is desired to increase the superheat, as, for example, when the boiler is forced to such a high rating that the superheat begins to drop (see Fig. 6), this can be effected in some cases by by-passing a certain amount of saturated steam around the hotter superheaters. The effect, of course, is to reduce the flow through the hotter superheaters with a resultant greater efficiency of heat absorption and to increase the flow through the colder superheaters, which, as will appear from Fig. 6, will cause a more efficient heat absorption in these superheaters which have not yet reached the peak of their efficiency.

A large number of other combinations of operation are, of course, possible and I have described only a few typical combinations. It should be understood, however, that the invention is not limited to the valve arrangements and operating conditions outlined above and on the contrary, it will be clear to those skilled in the art that modifications may be desirable in any particular installation. The by-pass valves shown in Fig. 8 are manually operated. Obviously, of course, some or all of these valves may be operated thermostatically, from a thermostat in the main 68.

A three-pass boiler having three superheaters, one in each pass, is shown in Fig. 8. This arrangement is very flexible and permits an exceedingly long travel of gases in contact with generating and superheating tubes. The invention is, of course, not limited to this particular arrangement of the bent tube cross drum boiler and obviously, one or more of the superheaters may be omitted where this may be desirable and other types of boilers may be baffled to incorporate the principles and advantages of the present invention and it should be understood that Fig. 8 is merely an illustration of one of the many possible embodiments of my invention.

In Fig. 9, a rebaffled Wickes boiler is shown in conjunction with series superheaters such as are shown in Fig. 8. The boiler consists in drums 192 and 193 connected by water tubes 194. In addition to the customary center baffle 195, additional side baffles 196 and 197 have been added. As a result, it will be seen that the gas travel along the water tubes has been doubled in length and the gases are caused to come into much closer and intimate contact with the water tubes in their long travel. This is of importance in increasing the efficiency of the boiler as a saturated steam generator. The superheaters consist in upper headers 200, 202, 204 and 206 and lower headers 201, 203, 205 and 207 connected by tubes 208, 209, 210 and 211. Lower headers 201 and 203 are connected together by the pipe 212 and lower headers 205 and 207 are similarly connected by the pipe 213, while upper headers 202 and 204 are connected by the pipe 214. Saturated steam from the upper drum passes into the header 200 through the pipe 198 and superheated steam from the header 206 is taken off through the saturated steam pipe 199. It will be apparent that the superheater elements are arranged so that the steam passes through them in series and it will also be apparent that the steam is always flowing counter to the gas flow. As the superheater tubes are distributed among the water tubes, the hydraulic mean depth of the generator is very greatly decreased and the velocity of the gases possible along the tubes is also greatly increased. The resulting efficiency is very high and due to the fact that the superheater tubes are adjacent to the water tubes for such a long travel, a comparatively even superheat is produced which compares favorably with the superheat obtainable in film tube generators such as those described in Figs. 4 and 5.

The arrangement of baffles as shown in Fig. 9 results in a progressive decrease in gas passage cross section which is very desirable in order to maintain high velocities as the combustion gases in passing through the boiler are cooled and contract in volume. The baffling also greatly increases the length of travel of the gases in contact with the generator tubes and correspondingly increases the efficiency of heat transfer to them.

In both Fig. 8 and Fig. 9, the steam flow through the superheaters is at all times counter to the gas flow. This, I have found, produces the most even superheat and most efficiently utilizes the heat units in the heating gases. In its broader aspects, the present invention is in no sense limited to a steam flow in the superheaters which is always counter to the gas flow, and on the contrary, in certain installations it may be desirable for structural or other reasons, to pass the steam through the superheaters in the same direction as the flow of gases or to pass it in counter flow in some superheaters and in the same direction in others. The Figs. 8 and 9 show rebaffling of two common types of water tube boilers and are to be taken as illustrations of typical installations which embody the novel feature of close confinement of heating gases to the generating tubes coupled with decreased hydraulic mean depth and increased velocity and length of gas travel in contact with steam generating and superheating surfaces. These advantages in a greater or less degree can be obtained by rebaffling any of the common types of water tube boilers and in a broad sense, the present invention is not limited to any particular design of water tube boiler, nor is it limited to a complete confinement of the heating gases in all the passes of the multi-pass boiler. In some cases, it may be desirable to closely confine the gases only in the first pass or only in the last pass and while the greater efficiency is achieved by a closely confined gas travel through all of the passes of the muti-pass boiler, the advantages are obtained, although in a lesser degree, where any part of the boiler is so baffled.

Figs. 10 and 11 illustrate a locomotive boiler of the usual fire tube type. The water space 215 is shown as surrounding both the fire box 216 and the fire tubes 217. A steam dome 218 and saturated steam collecting pipe 219 are also provided as in usual embodiments. The smoke box 220 is shown diagrammatically and does not depart from conventional practice. In a portion of the fire tubes which are usually of somewhat larger size, one or more superheater tubes 221 are inserted. These tubes extend from the intake headers 222 to the outlet headers 223 which extend into the fire box. In order to protect the exposed superheater collector 223, provision is made by means of the pipes 224 and pump 225 to inject a definite amount of water into the collectors. This has a double function of controlling superheat and preventing damage to the collectors from the high heat of the fire box. The collectors 223 are joined into a superheater main or header 226 from which the pipe 227 goes to the steam chest 228 and is provided with the customary throttle valve 229. A valve 230 may also be included in the water injection circuit to control either manually or automatically the water injection. As shown in the drawings, the water injected into the collectors 223 is taken from the water space of the boiler itself. By thus injecting hot water, it is possible to deal with larger quantities of water and for some purposes this is desirable as it is more easy to regulate the amount injected. The invention, however, is not limited to the use of hot water from the boiler and cold feed water may be injected in smaller quantities if desired. Instead of providing for water injection to control the superheat and protect the superheated steam collected in the fire box, these collectors may be made of special heat resisting metals or may be screened from the radiant heat of the fire box for example by a suitable screen of tubes filled with water and acting as a feed water header or as auxiliary saturated steam generating tubes. Other protecting means may be adopted. Thus, for example, it is possible to lead out the superheater tubes through fire tubes and the water and steam space before the fire box is reached. This modification, while protecting the superheater tubes, presents considerable constructional difficulties and also tends to cool the superheated steam by contact with cooler saturated steam in the boiler. However, effective insulation of the superheated steam collector tubes will avoid this difficulty to a large extent.

The superheater tubes in Figs. 10 and 11 have been shown as connected to the saturated steam boiler in such a manner that the steam flows through the tubes in a direction counter to that of the gas flow. This is the most efficient manner of arranging the tubes and using the heat of the gases. It is possible, however, to connect the superheater tubes in the reverse manner so that steam flows in the same direction as heating gases. When this is combined with water injection in case of exposed headers in the fire box, the superheater tubes may be caused to generate steam as well as to superheat it.

Not only is the superheat control in locomotive boilers as shown in Figs. 10 and 11 a very even one, but the efficiency of the boiler as a saturated steam generator is very greatly increased as the placing of one or more superheater tubes inside of the fire tubes decreases the hydraulic mean depth and greatly increase the velocity with a consequently large increase in efficiency of heat absorption.

Figure 12:
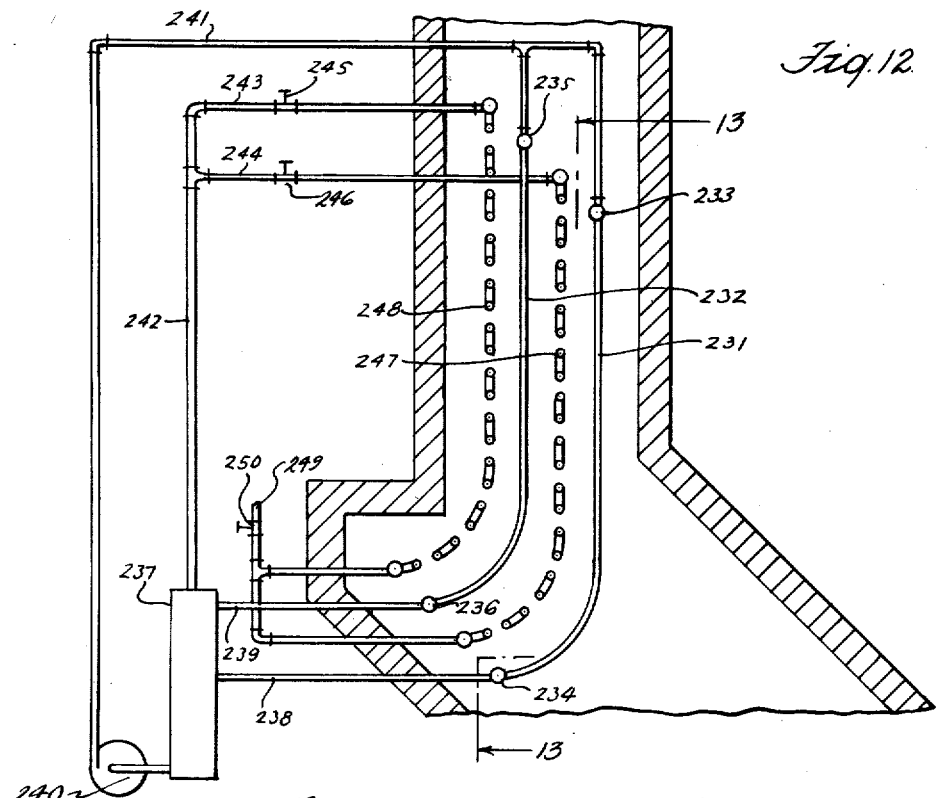
Figure 12 is a vertical cross-section of a film tube generator provided with a winding tube superheater.
Figure 13:
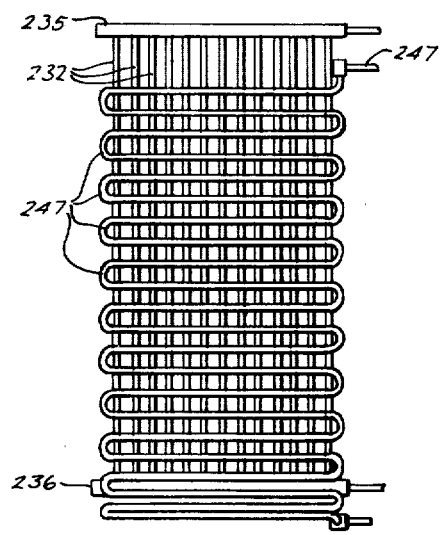
Figure 13 is a section along line 13—13 of Figure 12 showing a detail of the superheater.
Figure 14:
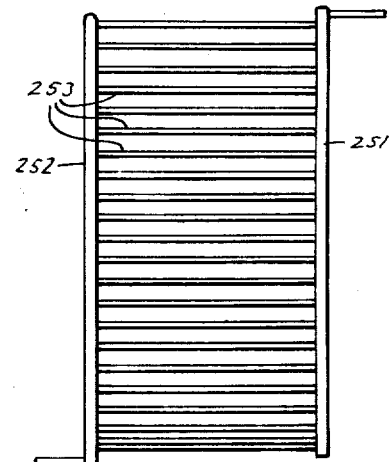
Figure 14 is a section through a modified form of superheater.

Figs. 12, 13 and 14 illustrate the arrangement of superheater and film tube generators which is desirable for certain installations. The film tube generator tubes are shown at 231 and 232. The corresponding upper headers 233 and 235 and lower headers 234 and 236 are arranged in the usual manner as described in my prior patent and application. The headers 234 and 236 are connected to the steam separating pot 237 by the pipes 238 and 239. Steam and water are separated in the separator and the water is circulated by the pump 240 through the pipe 241 into the upper headers 233 and 235. The saturated steam flows from the separator through the pipe 242 and branch pipes 243 and 244 controlled by valves 245 and 246 into the superheaters 247 and 248. These superheaters consist in a winding pipe as is shown in Fig. 13. The steam in flowing through the pipe is, of course, not flowing at all times counter to the gas flow but the total resultant steam flow is the same as if a series of parallel tubes were used and for some purposes the single winding tube arranged as shown is desirable. The superheaters are connected at the bottom of the generator to the superheated steam pipe 249 controlled by the valve 250.

Instead of using a winding pipe as shown in Fig. 13, two vertical header pipes 251 and 252 (Fig. 14) are connected by a series of horizontal pipes 253. Obviously, this construction produces a general steam flow which is similar to parallel vertical tubes and the construction is advantageous for certain installations.

The superheater shown in Figs. 12 to 14 being arranged parallel and adjacent to the film tube steam generator tubes, a very uniform proportion of heat is produced along the superheaters and as a consequence, the superheat is relatively even. Variations in superheat, despite the even gradient, are taken care of by operation of the valves 245 and 246 which determine the relative amounts of steam flowing through the hotter superheater 247 and the colder superheater 248. The control is similar to that which is effected in the installations described in connection with other types of boilers. Obviously, the valves may be operated thermostatically instead of by hand.

In the film tube generators which have been illustrated, the superheaters have been arranged so that the steam through the superheaters is in the same direction as the water circulation and counter to the gas flow. This is in no sense essential to the invention, although constituting a preferred embodiment. On the contrary, the flow of steam through the superheating elements may be in a direction opposite to that of the flow of water through the generated elements and may be either with the gas flow or counter to it. While slightly less effective from a heat absorption standpoint, the arrangement has some structural advantages in that the film tube generator can be designed with split upper headers, the upper portion of the inclined lower collector or pot with the corresponding tubes connected thereto being used as a superheater header. This results obviously in a very compact arrangement and permits the performance of a dual function by the two headers.

Figure 15 illustrates a combination of a dry superheater and a superheater with water injection combined with an ordinary type of water tube boiler which has been rebaffled in order to improve the gas circulation. The boiler, which is of an inclined horizontal tube type, consists of a large steam and water drum 254 provided with water headers or collectors 255 and 256 connected by long inclined horizontal tubes 257. A baffle 258 extending from the left hand furnace wall almost the full length of the tubes combined with the baffles 259 and 260 forces the gases to take the path shown by the arrows and closely confines the gases to the tubes. The baffles are so distributed that the volume of the first pass between the baffles 258 and 259 is very much greater than the volume of the second pass. This results in a maintenance of high gas velocities despite the fact that the combustion gases in being cooled by passing over the generating tubes contract to a much smaller volume which in ordinary installations may be as little as 1/3 the volume at the highest combustion temperatures. A superheater composed of headers 261 and 262 connected by tubes 263 is placed in the first pass and closely adjacent and parallel with the generating tubes. A second superheater consisting in headers 264 and 265 connected by tubes 266 is placed along the back wall of the combustion chamber. This second superheater consists in a series of film tubes, the upper header 264 being connected to the water header 256 by the pipe 267 controlled by the valve 268. Saturated steam from the drum 254 is carried to the superheater header 261 by the pipe 269 and superheated steam from both the headers 262 and 265 is carried to the superheated steam main 270 by the pipes 271 and 272. A pump 273 and pipe 274 leading to the feed water pipe 275 returns any water formed in the header 265 to the boiler circulating system. A thermostat 276 controls the valve 268 and regulates the amount of water which is injected into the tube 266. A by-pass of saturated steam into the superheated steam main can be effected through the pipe 277 controlled by the valve 278 which may be actuated manually or by the thermostat.

In operation, saturated steam from the main boiler passes through the superheater tubes 263 and water is injected into the tubes 266 in amount less than can be evaporated in the tubes so that normally superheated steam is discharged into the header 265 and thence through the pipe 272 into the superheated steam main. The superheater tubes 266 which are exposed to the full heat of the gases and also to the radiant heat of the flame are very effectively cooled by the constant flow of water through them and at the same time act as a screen for the combustion chamber wall. The valve 268 is arranged so that it cannot completely close and sufficient water is always injected into the tubes 266 to produce a film throughout the portion of the tubes which is directly in the path of the main gas flow and which consequently is subjected to the highest heats. As the rating of the boiler increases, the temperature of the steam in both the superheaters increases, the increase in the film tube superheater, of course, being very much greater than in the dry superheater owing to the fact that the former is directly exposed to the full intensity of the flame. As the superheat temperature increases in the main 270, the thermostat opens the valve 268 thereby injecting an increased quantity of water into the tubes 266. The valve 268 is steadily opened until the film in the tubes 266 reaches the lower header 265. In other words, the superheater begins to discharge saturated steam which cools down the superheated steam generated in the dry superheater. In extreme cases where even the amount of saturated steam generated in the tubes 266 is insufficient to bring down the temperature of the superheated steam to the point desired, the thermostat can be so arranged that after the valve 268 is opened to its maximum, the valve 278 begins to open and saturated steam is by-passed directly through the pipe 277 into the superheated steam main. In normal operation, this by-pass would not be necessary and installations can safely be made in which the direct by-pass is completely omitted. It is only shown in the present drawing to illustrate the possibility of providing such a by-pass for boilers which are operating under extreme conditions.

The header 265 is provided with a water level control 279 which controls the speed of the pump 273 and which may also control a shut-off valves 280 in the pipe 274 and in the suction of the pump. The water level control is so set that as long as the superheater tubes 266 discharge dry steam into header 265, the valves 280 will be closed and the pump 273 will not run. As soon as the injection of water into the tubes 266 becomes sufficient to maintain a film of unevaporated water over the full length of the tubes, and, therefore, water is discharged into the separating header 265, the water level control will operate to open the valves 280 and to start the pump 273, returning the water through the pipes 274 and 275 into the water drum of the boiler. This return of water by the pump aids in maintaining the normal circulation of water in the main boiler which is indicated by arrows and thus increases the efficiency of the main boiler as well as providing a very satisfactory method of keeping down the superheat under various boiler operating conditions.

The water injection superheater performs a further desirable function where the main boiler is to be used intermittently. Thus, when it is desired to start the boiler when cold, the high temperature of the gases striking the tubes 266 combined with the effect of radiant heat will cause steam to be generated in the tubes 266 almost immediately. Thus, it is possible to start the boiler cold and generate superheated steam in the superheater tubes 266 before the main boiler delivers steam. This is of advantage in reducing the time otherwise necessary for raising steam and constitutes an added advantage of the combination of film tube water injection superheaters with ordinary types of boilers. Injection of water in the form of a film presents many advantages and constitutes the preferred construction of superheater. Many of the advantages of the installation described can, however, be obtained with a superheater in which the water is not injected so as to form a film but is injected so as to fill substantially the whole cross-section of the tubes and in some installations this type of superheater may be desirable.

The arrangement shown in the drawings in which the film tube water injection superheater is arranged as a screen for the combustion chamber wall is a very desirable one as the superheater performs a number of important functions and the change can be readily effected in many of the common horizontal water tube and other boilers without far-reaching structural changes. It should be clearly understood, however, that such an arrangement, while possessing many advantages, is in no sense the only arrangement which can be made, and, on the contrary, a water injection film tube superheater may be combined with other types of steam boilers, either water tube or fire tube, and may be arranged in various positions with relation to the main boiler which may prove desirable for the particular installation from the structural or operating standpoint. It will be apparent to the skilled steam engineer what changes in placement and operation of the water injection film tube superheater will be desirable in order to most advantageously utilize the principles of the present invention in any particular installation. Obviously, of course, manual control of the valve 268 or the valve 278 or both may be substituted for thermostatic control and thermostats in the individual superheated steam leads 271 and 272 may also be provided. For most purposes, however, I have found that the thermostat in the superheated steam main gives the most uniform and reliable results and constitutes the preferred embodiment of this phase of the invention, without, of course, limiting the scope of the latter.

In the embodiments of the present invention which have been illustrated in the drawings and described above, the superheaters have been arranged so that the steam flows counter to the gas flow and in the case of film tube steam generators, illustrated for example in Figs. 4, 5 and 12 to 14, this has necessitated introducing the saturated steam at the top of the superheater and passing it down through them. For most installations where space is not at a premium, this construction is very advantageous as it provides for a straight gas flow and permits close placement of tubes with correspondingly decreased hydraulic mean depth without necessitating too great an increase in draft. There are, however, numerous installations in which space is very much at a premium and a compact generator and superheater is very desirable. Such a compact integral film tube generator and superheater is illustrated in Fig. 16 and provides for an efficient proportioning of gas travel which is counter both to the water circulation and to the steam circulation.

The generator consists in an integral lower header or pot 282 and three separate upper headers 283, 284 and 285 connected to the pot by the tubes 286, 287 and 288. The three sets of tubes are separated by the two baffles 289 and 290 and thus form three passes. The gas flow as shown by the arrows is upward through the first pass, downward through the second and upward through the third. The baffles are so inclined and the spacing of the tube connections on the headers are so proportioned that the cross-section of each pass decreases continuously in proportion to shrinkage in volume of the combustion gases as they are cooled in passing over the tubes. The first and third passes are provided with water injection into the headers 283 and 285 by means of the pump 291, pipe 292 and branch pipes 293 and 294 provided with the valves 295 and 296. The feed water is added to the pump circulation through the pipe 297 provided with the valve 298 which is actuated by the water level control 299. Superheated steam is taken off from the header 284 through the pipe 300. The operation of the generator is as follows. For normal low ratings, the valves 295 and 296 are so adjusted that the amount of water introduced into the tubes 286 is greater than that which can be evaporated by passing therethrough and accordingly saturated steam and water is discharged in the lower portion of the pot 282. The amount of water introduced into the header 285, however, is less than that which can be evaporated in the tubes 288 and accordingly superheated steam is discharged from these tubes into the upper portion of the pot. The saturated steam from the tubes 286 and moderately superheated steam from the tubes 288 then flows up through the tubes 287 where it is further superheated. As the boiler rating increases, a larger and larger quantity of water is introduced into the header 285 so that the steam discharged from the tubes 288 is of a lower and lower superheat temperature and finally is discharged in the form of saturated steam.

It will be seen that the hottest gases in the first pass come in contact with tubes which are supplied with an ample amount of water and are not subject to danger from irregular running of the boiler or sudden increase in flame temperature. The superheater tubes 287 are in the zone of sufficiently low heat so that they are not in danger of burning out. The generating tubes 288 situated in the lowest heat zone, subsequently abstract from the cooled gases their last quota of heat so that the gases passing out to the stack may be in ordinary operation at or near the temperature of the water introduced into the header 285.

Where the flame is not extreme in temperature or where the pot and generating tubes 286 are made of particularly resistant metals, it is possible to generate superheated steam in the tubes 286 as well as in the tubes 288 by restricting the water flow through the valve 295. This makes possible a very high superheat since the superheater tubes 287 are not fed with saturated steam but are fed with steam which is already superheated.

Manually operated valves 295 and 296 have been shown, but it is, of course, obvious that a thermostat can be placed in the superheated steam pipe 300 and used to automatically operate the valve 296 in order to control the superheat by control of the temperature of the steam generated in the tubes 288. For most purposes, it is desirable to use manual control on the valve 295 or if an automatic control is desired, this is preferably actuated by the water level 299 as it is important in most installations to assure a continuous and plentiful supply of water to the tubes in the first pass to prevent their burning out. Where, however, in unusual installations it is desired to generate superheated steam in the tubes 286, the valve 295 can, of course, also be controlled thermostatically in accordance with the temperature of the superheated steam in the pipe 300. Other methods of control may also be used and are included in the invention.

The design and shape and the number of passes may be varied greatly depending on operating conditions and on the space available. It is, thus, perfectly practicable to use a double pass, omitting the tubes 288. A saving in space is effected at the expense of reliability of superheat control and also at the expense of efficiency as it is relatively difficult with a practical number of tubes to reduce the gas temperature in the superheater pass to the temperature of the saturated steam entering it, whereas it is a very simple matter to reduce the gas temperature to or near that of the intake water when the last pass contains generating tubes owing to the high heat absorption of the water film in the tubes. It should be understood, however, that the principles of the invention are in no sense limited to the three-pass generator shown, which, however, constitutes the preferred embodiment of my invention, and, as pointed out above, combines a maximum of efficiency and reliability of temperature control with compact arrangement and reasonable draft pressure.

The header tube and pot construction of the three-pass generator and superheater described above may, of course, be greatly varied and may include structural modifications such as are described in my prior patent and application referred to above. The drawing is purely diagrammatic and is not intended to show structural details with which, in its broader aspects, the present invention is not concerned. The separate top header construction, shown for the sake of simplicity, is efficient and practicable, but many other modifications may be utilized. For example, the headers 283, 284 and 285 may be a single header with dividing walls. This construction has the advantage of greater mechanical strength and in some installations may be very desirable and may simplify the construction. Numerous other modifications are, of course, possible and are intended to be included with the present invention.

The foregoing details described of the installations shown in the drawings and which constitute a few typical embodiments of the principles of the present invention should not be considered as limiting the invention either to the particular boilers or to the particular superheater placements therein shown and especially, the invention is not limited to combinations of certain placements of superheater elements, baffles or other arrangements with a particular type of boiler and, on the contrary, these features may be used with other types of boilers and the combinations of certain features with certain boilers is not to be taken to indicate that these features are only or even especially applicable to a boiler design with which they are shown. An attempt has been made to show all of the features of the present invention with a minimum of detailed different installations in order to confine the description of the present application to a reasonable size. The number of types of steam generators is, however, very large and the particular modifications necessitated by operating and structural conditions in individual installations presents an almost unlimited number of possibilities of combinations of one or more of the features of the present invention with particular boilers to be used for particular purposes. Such combinations will be apparent to skilled steam engineers who will at once appreciate what features or combinations of features of the present invention should be embodied in a particular boiler to bring about a maximum of efficiency and reliability for the conditions under which the boiler is to operate.

Throughout the specification, the word "parallel" has been used in a very loose sense, thus "superheater elements" and "gas flow" have been spoken of as "parallel" to "generating tubes". This expression is not intended to mean that the tubes or the gas flows are geometrically parallel, but merely that the flows and the tubes or heat transfer surfaces are arranged so that they extend in the same direction and are sufficiently adjacent to bring about the advantage of the present invention. Thus, for example, in Fig. 16, none of the generating tubes and superheater tubes are mathematically parallel to each other, and, on the contrary, they are inclined so as to accommodate themselves to the constantly decreasing volume of the heating gases. The flow of the gases along the tubes is, however, one which may be considered as parallel and in this wider and broader sense I have used the word "parallel" throughout the specification and claims for want of a better and more adequate word and the invention is not to be considered in any sense as limited to placements of tubes or arrangements of gas flows which are mathematically parallel.

The principles of the present invention are very flexible in their application and the correct choice of modifications embodying them will be guided by the conditions in any particular design of steam generating plant. The boilers shown in the illustrations are designed to produce saturated and superheated steam at a single pressure. In most installations, this is the desired type, but it will be clear to those skilled in the art that by providing separate superheated steam mains, it is possible to generate superheated steams at the same pressure and different superheats or by suitable multiples of saturated steam connections, it is possible to generate saturated or superheated steam at different pressures from the same boiler. There are, of course, innumerable possible combinations and the features of the present invention, in part or in whole, may be applied to any of the possible variations of steam delivery.

The present invention is applicable to boilers fired either by solid, liquid or gas fuel, powdered coal or any suitable fuel. Combustion temperatures and boiler ratings may be of the most varied character and some of the features of the present invention are equally applicable and equally advantageous to all combinations. The screening effect or arranging a superheater appartaus parallel and closely adjacent to generating tubes and by introducing water into certain of the superheater tubes are, of course, particularly and peculiarly applicable to installations where the load is varied and where the combustion temperatures run very high. It should be understood, however, that the invention is not in any sense limited to boilers operating under such conditions and even boilers where the combustion temperatures are sufficiently low or the superheater placement is such that there is little or no danger of burning the superheater tubes, may be provided with the superheat control features of the present invention without any of the screening or safety features.

What is claimed as new is:

1. The method of controlling the degree of superheating of steam which comprises passing steam through at least two superheaters situated in different heat zones, combining the steam issuing from the different superheaters, and varying the relative amounts of the steam passing through the different superheaters.

2. The method of controlling the degree of superheating of steam which comprises passing steam through at least two superheaters situated in different heat zones, combining the steam issuing from the different superheaters, and automatically varying the relative amounts of the steam passing through the different superheaters.

3. The method of controlling the degree of superheating of steam which comprises passing steam through at least two superheaters situated in different heat zones, combining the steam issuing from the different superheaters, and increasing the relative flow through the superheaters in the lower heat zones when the temperature of the superheated steam tends to increase.

4. Method of superheating steam by absorption of heat from flowing gases combined to transfer their heat principally by convection which consists in generating steam by absorption of heat from said flowing gases whereby is produced a gradient of temperature in the gases along the path of said flow, and causing the steam while being superheated to flow in relation to said gradient of temperature so as to be progressively subjected to the progressively different temperatures of said gradient substantially throughout said steam flow.

5. Method of controlling the degree of superheating of steam which consists in generating steam by absorption of heat from flowing gases, whereby is produced in said flow of gases a temperature gradient, and causing said steam while being superheated by absorption of heat from said gases confined to transfer their heat principally by convection under the action of said temperature gradient to flow generally unidirectionally in relation to said gradient.

6. Apparatus for producing superheated steam comprising a plurality of superheaters located in different heat zones and arranged for a flow of steam therethrough, a collector connected to receive steam from the superheaters, and means for varying the relative amounts of steam flowing through the superheaters to produce a desired temperature of the superheated steam.

7. Apparatus for producing superheated steam comprising a plurality of superheaters located in different heat zones and arranged for a flow of steam therethrough, a steam collector connected to receive steam from the superheaters, a valve to regulate the relative amounts of steam flowing to the collector from the superheaters, and mechanism actuated automatically in accordance with the temperature of the steam in the collector for operating said valve, whereby superheated steam of a desired temperature may be obtained.

8. An apparatus for the control of superheating of steam which comprises generator tubes parallel to the gas flow, at least two sets of superheater tubes, in different heat zones, a common main into which the tubes discharge, at least one set being parallel and adjacent to a set of generating tubes, and means for varying the relative amounts of steam flowing through the different superheaters.

9. An apparatus for the control of superheating of steam which comprises generator tubes parallel to the gas flow, at least two sets of superheater tubes in different heat zones, a common main into which the tubes discharge, at least one set being parallel and adjacent to a set of generating tubes, and automatic means for varying the relative amounts of steam flowing through the different superheaters.

10. An apparatus for the control of superheating of steam which comprises generator tubes parallel to the gas flow, at least two sets of superheater tubes in different heat zones, a common main into which the tubes discharge, at least one set being parallel and adjacent to a set of generating tubes, and means for varying the relative amounts of steam flowing through the different superheaters, said means being automatically actuated by a thermostat in the superheated steam main, said thermostat causing an increase of flow in the superheaters situated in lower heat zones when the temperature of the superheated steam in the main increases.

11. An apparatus for the control of superheating of steam which comprises La Mont type film steam generating tubes parallel to the gas flow, at least two sets of superheater tubes in different heat zones, a common main into which the tubes discharge, at least one set being parallel and adjacent to a set of generating tubes, and means for varying the re'ative amounts of steam flowing through the different superheaters.

12. An apparatus for the control of superheating of steam which comprises La Mont type film steam generating tubes parallel to the gas flow, at least two sets of superheater tubes in different heat zones, a common main into which the tubes discharge, at least one set being parallel and adjacent to a set of generating tubes, and automatic means for varying the relative amounts of steam flowing through the different superheaters.

13. An apparatus for the control of superheating of steam which comprises La Mont type film steam generating tubes parallel to the gas flow, at least two sets of superheater tubes in different heat zones, a common main into which the tubes discharge, at least one set being parallel and adjacent to a set of generating tubes, and means for varying the relative amounts of steam flowing through the different superheaters, said means being automatically actuated by a thermostat in contact with the superheated steam, said thermostat causing a relatively increased amount of steam to flow through superheaters situated in lower heat zones when the temperature of the superheated steam in the main increases.

14. An apparatus for the generation of superheated steam, comprising, in combination, steam generating tubes, superheater tubes arranged parallel and adjacent to at least a portion of the generating tubes, means for causing all of the heating gases to pass along and closely confined to the generating and superheating tubes and to transfer heat to the tubes chiefly by convection, and means for causing steam to flow in the superheater tubes substantially throughout its flow therethrough in a direction generally counter to the gas flow, whereby the steam as it flows in the superheater tubes is subjected to progressively higher temperatures in the gas as it flows over the generating tubes.

15. An apparatus for generating superheated steam in a plurality of superheaters arranged according to claim 14, in which at least two of the superheaters are arranged in zones of different heat and discharge into a common main and means are provided for varying the relative amounts of steam passing through the different superheaters.

16. A generator for producing superheated steam which comprises steam generating elements, at least two superheaters located in different heat zones and connected to the saturated steam collector of the steam generator, a superheated steam main and connections from the superheaters to said superheated steam main, control means located in the connections of at least one of the superheaters to the saturated steam collector of the generator and thermostatic means located in the superheated steam main for actuating said control means.

17. A generator for producing superheated steam which comprises steam generating elements, at least two superheaters located in different heat zones and connected to the saturated steam collector of the steam generator, a superheated steam main and connections from the superheaters to said main, control means located in the connections of at least one of the superheaters to the saturated steam collector of the generator and thermostatic means located in the superheated steam main for actuating said control means, the thermostatic means operating so as to cause a relative increase of flow of steam through at least one superheater in a relatively low heat zone when the temperature in the superheated steam main increases.

18. An apparatus for the generation of superheated steam, comprising in combination saturated steam generating tubes, superheater tubes, at least two sets of which are arranged in zones of different heat and a part of which are arranged parallel to and adjacent to at least a part of the generating tubes, a common main into which the superheater tubes discharge, and means for varying the relative amounts of steam passing through the different superheaters.

19. An apparatus for the generation of superheated steam, comprising in combination saturated steam generating tubes, superheating tubes, at least two sets of which are arranged parallel to and adjacent to at least a part of the generating tubes and parallel to the gas flow, a common main into which the superheater tubes discharge, and means for varying the relative amounts of steam passing through the different superheaters.

20. An arrangement for controlling the superheating of steam in a steam boiler having steam generating tubes and superheater tubes which absorb heat from heating gases flowing thereover, characterized by the fact that the superheater tubes are interspersed with the generating tubes and are placed in the flow of the heating gases so that said gases are closely confined thereto and the opposite ends of the tubes are remote from each other in the direction of said flow and have their extent generally in the direction of said flow, and by the fact that means are provided for introducing steam into one end of the superheating tubes and withdrawing it from the other end thereof so that the steam substantially throughout its flow in said superheater tubes is progressively subjected to the progressively different temperatures of the gases corresponding to those to which the steam generating tubes are exposed.

21. An apparatus according to claim 20, in which water is supplied to the steam generating tubes in quantity greater than their evaporating capacity, and in which steam is introduced into the ends of the superheater tubes remote from that at which the heating gases enter, and which steam flows along the superheater tubes in a general direction counter to the gas stream.

22. An apparatus according to claim 20, in which water is supplied to the steam generating tubes in quantity greater than their evaporating capacity, and in which water is introduced into the ends of the steam generating tubes remote from that at which the heating gases enter, and in which the steam is introduced into the superheater tubes remote from that at which the heating gases enter, so that the steam flows through the superheater tubes and the water through the steam generating tubes in a general direction counter to the gas stream.

23. Apparatus for generating superheated steam comprising steam generating elements, steam superheating elements arranged closely adjacent to and interspersed with the steam generating elements, and means for confining the heating gases and causing them to flow closely adjacent to all the elements, said superheating elements being so arranged that the gases flow over each element from one end to the other end thereof and in such relation to the flow of steam therethrough that the steam substantially throughout its flow through the superheater is progressively heated in accordance with the temperature gradient produced by the absorption of heat from the gases by the steam generating elements.

24. Apparatus for generating superheated steam comprising steam generating elements, steam superheating elements for superheating steam as it flows therethrough arranged closely adjacent to and interspersed with the steam generating elements, and means for confining the heating gases closely to and causing them to flow along said superheating elements in counterflow relation to the flow of the steam therethrough, the arrangement of the superheating elements in the gas flow and the points at which steam is introduced into and discharged from said elements being such that the steam substantially throughout its flow through the superheater is progressively heated under temperature gradient conditions produced by the presence of the steam generating elements in the gas flow along the superheater elements.

25. Apparatus for generating and superheating steam comprising walls defining a heating gas passage, steam generating tubes in said passage and having water inlet ends adjacent to one end of the passage and outlet ends adjacent to the other end, means for positively causing water to flow through said tubes and absorb heat from the gases flowing in said passage, thereby providing a controlled temperature gradient condition in said passage, and steam superheating tubes interspersed with the steam generating tubes and having the extent of their length in the direction of the length of the gas passage, whereby the steam to be superheated is caused to flow in the superheating tubes so as to be subjected to said temperature gradient conditions.

26. A steam generator of the type covered by claim 25 in which the steam is delivered to the superheating tubes at the cooler end of the passage and is caused to flow toward the hotter end, whereby the steam is progressively heated in counter flow relation to the travel of the gases.

27. Apparatus for generating superheated steam comprising walls defining a heating gas passage, steam generating tubes arranged within the passage so that said walls confine the flow of the gases closely thereto, steam superheating tubes for superheating the steam as it flows therethrough interspersed with the generating tubes, said superheating tubes having their lengthwise extent from one end thereof to the other end thereof extending generally in the direction of the length of the passage, and means for delivering steam from the generating tubes to the superheating tubes at the cooler end of the gas passage, said tubes being so arranged that the steam being superheated as it flows toward the other end of the passage is subjected to a progressively increasing temperature which is controlled by the presence of the steam generating tubes.

28. Apparatus for superheating steam comprising steam generating elements subjected to the heat of flowing gases, at least two sets of superheating elements arranged in different heating zones, one of said sets being interspersed with said steam generating elements and so arranged relative to the flow of gases thereover that the steam in said set is progressively heated under temperature gradient conditions produced by the presence of said steam generating elements, a collector receiving the steam from the sets of superheating elements, and means for varying the relative flow of steam from said superheating elements to the collector in order to control the temperature of the superheated steam.

29. Apparatus for generating superheated steam which comprises steam generating elements, means for confining heating gases to flow in contact with said steam generating elements and to transmit heat thereto, whereby is produced a gradual change of temperature along the path of flow of said gases, superheater elements arranged with their extent generally along said path of flow of the gases and providing a path for steam flow therein extending in one general direction, the inlet to the path of steam flow in said superheating elements being remote from the outlet from said path of flow in said superheating elements, whereby the flow of the steam in said superheating elements is progressively along the path of flow of said gases and is subjected substantially to the range of the temperature of the gases produced by the steam generating elements.

30. Apparatus for generating superheated steam comprising steam generating elements, steam superheating elements for superheating steam as it flows therethrough arranged closely adjacent to and interspersed with the steam generating elements, means for confining heating gases closely to and causing them to flow in heat exchanging relation to said steam generating elements, said superheating elements being arranged with relation to said flow of the heating gases so that the general direction of the extent of said superheating elements from the inlet thereof to the outlet thereof is along the flow of the heating gases, and means for introducing the steam to be superheated into that end of the elements toward which the gases flow so that the steam substantially throughout its flow through the superheater is progressively heated under temperature gradient conditions produced by the presence of the steam generating elements in the gas flow along the superheater elements.

Signed at New York, New York, this 22nd day of January, 1926.

WALTER DOUGLAS LA MONT.

CERTIFICATE OF CORRECTION.

Patent No. 1,866,893.  July 12, 1932.

WALTER DOUGLAS LA MONT.

It is hereby certified that error appears in the printed specification of the above numbered patent requiring correction as follows: Page 10, line 68, for "generated" read "generating"; page 14, line 56, claim 4, for "combined" read "confined"; and that the said Letters Patent should be read with these corrections therein that the same may conform to the record of the case in the Patent Office.

Signed and sealed this 17th day of January, A. D. 1933.

(Seal)

M. J. Moore,
Acting Commissioner of Patents.

ments, means for confining heating gases to flow in contact with said steam generating elements and to transmit heat thereto, whereby is produced a gradual change of temperature along the path of flow of said gases, superheater elements arranged with their extent generally along said path of flow of the gases and providing a path for steam flow therein extending in one general direction, the inlet to the path of steam flow in said superheating elements being remote from the outlet from said path of flow in said superheating elements, whereby the flow of the steam in said superheating elements is progressively along the path of flow of said gases and is subjected substantially to the range of the temperature of the gases produced by the steam generating elements.

30. Apparatus for generating superheated steam comprising steam generating elements, steam superheating elements for superheating steam as it flows therethrough arranged closely adjacent to and interspersed with the steam generating elements, means for confining heating gases closely to and causing them to flow in heat exchanging relation to said steam generating elements, said superheating elements being arranged with relation to said flow of the heating gases so that the general direction of the extent of said superheating elements from the inlet thereof to the outlet thereof is along the flow of the heating gases, and means for introducing the steam to be superheated into that end of the elements toward which the gases flow so that the steam substantially throughout its flow through the superheater is progressively heated under temperature gradient conditions produced by the presence of the steam generating elements in the gas flow along the superheater elements.

Signed at New York, New York, this 22nd day of January, 1926.

WALTER DOUGLAS LA MONT.

CERTIFICATE OF CORRECTION.

Patent No. 1,866,893.  July 12, 1932.

WALTER DOUGLAS LA MONT.

It is hereby certified that error appears in the printed specification of the above numbered patent requiring correction as follows: Page 10, line 68, for "generated" read "generating"; page 14, line 56, claim 4, for "combined" read "confined"; and that the said Letters Patent should be read with these corrections therein that the same may conform to the record of the case in the Patent Office.

Signed and sealed this 17th day of January, A. D. 1933.

(Seal)

M. J. Moore,
Acting Commissioner of Patents.

CERTIFICATE OF CORRECTION.

Patent No. 1,866,893.  July 12, 1932.

WALTER DOUGLAS LA MONT.

It is hereby certified that error appears in the printed specification of the above numbered patent requiring correction as follows: Page 10, line 68, for "generated" read "generating"; page 14, line 56, claim 4, for "combined" read "confined"; and that the said Letters Patent should be read with these corrections therein that the same may conform to the record of the case in the Patent Office.

Signed and sealed this 17th day of January, A. D. 1933.

(Seal)

M. J. Moore,
Acting Commissioner of Patents.